United States Patent
Sawai et al.

[11] Patent Number: 6,077,389
[45] Date of Patent: Jun. 20, 2000

[54] METHOD FOR DEINKING

[75] Inventors: Minoru Sawai; Yoichi Ishibashi, both of Wakayama, Japan

[73] Assignee: Kao Corporation, Tokyo, Japan

[21] Appl. No.: 09/050,802

[22] Filed: Mar. 31, 1998

[30] Foreign Application Priority Data

Apr. 21, 1997 [JP] Japan ..................... 9-103128

[51] Int. Cl.$^7$ ....................... D21B 1/08
[52] U.S. Cl. ................... 162/4; 162/5; 252/60; 252/61
[58] Field of Search .............. 162/4, 5; 134/19, 134/25.1, 36, 39, 40; 252/60, 61

[56] References Cited

U.S. PATENT DOCUMENTS

| | | | |
|---|---|---|---|
| 5,665,204 | 9/1997 | Rodriguez et al. | 162/5 |
| 5,718,801 | 2/1998 | Li et al. | 162/5 |
| 5,786,559 | 3/1999 | Srivatsa et al. | 162/5 |

FOREIGN PATENT DOCUMENTS

| | | |
|---|---|---|
| 6-287878 | 10/1994 | Japan . |
| 7-003681 | 1/1995 | Japan . |
| 7-305287 | 11/1995 | Japan . |

*Primary Examiner*—Sean Vincent
*Attorney, Agent, or Firm*—Oblon, Spivak, McClelland, Maier & Neustadt, P.C.

[57] ABSTRACT

A deinking method for obtaining regenerated pulp of high brightness is provided. One or more of deinking agents selected from (a-1) to (a-2) given below are used, and a deinking step is carried out, in which a washing step is carried out at treating temperatures from 40 to 80° C.;

(a-1) : a compound represented by the general formula (a-1) given below, $$R_1\text{—O—}(AO)_p\text{—H} \qquad (a\text{-}1)$$

where $R_1$ is an alkyl group or an alkenyl group having 14 to 24 carbon atoms, AO is specific quantities of EO and PO, and p is a number to satisfy the specific quantities, (a-2): a compound represented by the general formula (a-2) given below, $$R_2[\text{—COO—}(AO)_m\text{—}R_3]_n \qquad (a\text{-}2)$$

where n is an integer of one or more, $R_2$ is a residue of carboxylic acid having 14 to 24 carbon atoms in total, $R_3$ is hydrogen atom or an alkyl group having 1 to 20 carbon atoms and the like, AO is specific quantities of EO and PO, and m is a number to satisfy the specific quantities.

10 Claims, No Drawings

METHOD FOR DEINKING

FIELD OF THE INVENTION

This invention relates to a method for deinking of waste papers of magazines, newspapers and the like, and more particularly to a method for deinking by which regenerated pulp of high brightness and high quality can be obtained when obtaining the regenerated pulp from printed waste papers of magazines, newspapers and the like by means of a flotation process.

PRIOR ART

Although reclamation or recycling of newspapers, magazines, etc. has been conventionally carried out, an apparatus or method for accelerating deinking more effectively and rapidly has been required for current waste papers because of changes in printing technique and printing process, alteration of compositions of printing ink, reclamation of waste papers which has not been conventionally recovered for reclamation and the like. As chemical agents which have been conventionally used for separating and removing impurities such as ink etc. from waste papers, anion activators such as alkylbenzensulfonate, sulfuric ester of higher alcohol, α-olefin sulfonate, dialkylsulfosuccinate and the like, nonionic activators such as adduct of ethylene oxide with higher alcohol, alkylphenol and fatty acid, alkanolamides and the like have been used as deinking agents independently or in combination of these two or more along with alkaline agents such as caustic soda (sodium hydroxide), sodium silicate, sodium carbonate, sodium phosphate and the like, bleaching agents such as hydrogen peroxide, hyposulfite, hypochlorous acid and the like, sequestering agent such as EDTA, DTPA and the like.

In the deinking method currently employed, nonionic surfactants, particularly nonionic surfactants of type of an adduct of ethylene oxide with higher alcohol etc. are widely used as a deinking agent. This is because that while the deinking agent used in, for example, a flotation method requires a balance between ink removing power for removing ink from waste papers as raw materials and frothing power for capturing removed ink in the flotation step, the ethylene oxide adduct-type nonionic surfactant can be easily changed in its property by alkyl chain length, number of moles of added ethylene oxide, etc. and can impart the ink removing power and frothing power depending on the objective.

There is, however, a limitation for obtaining regenerated pulp of sufficient brightness only by using such the ethylene oxide adduct-type nonionic surfactant, and hence it has been becoming increasingly difficult to obtain regenerated pulp of high quality in parallel with diversification of waste papers as raw materials.

JP-A 6-287878 and JP-A 7-3681 describe an adduct of alkylene oxide with special blocked carboxylic acid and an adduct of alkylene oxide with alcohol, but do not describe the temperature at the washing step.

JP-A 7-305287 an adduct of alkylene oxide with fat and oil, but does not describe the temperature at the washing step.

DISCLOSURE OF THE INVENTION

The inventors of this invention have studied devotedly in order to solve the aforesaid problems. As a result, the present inventors found that regenerated pulp of more high quality can be obtained without a lowering of deinking effect by using a deinking agent containing an adduct of alkylene oxide with specific higher alcohol or adduct of alkylene oxide with higher fatty acid or ester thereof and by setting the temperature at the washing step in the range from 40 to 80° C., and achieved this invention.

That is to say, this invention provides a method for deinking comprising a step for removing ink from waste papers as raw materials in the presence of one or more of deinking agent selected from (a-1) to (a-2) described below, and a step for carrying out washing of pulp after completion of deinking at temperatures in the range from 40 to 80° C.;

(a-1): a compound represented by the following general formula

$$R_1—O—(AO)_p—H \qquad (a\text{-}1)$$

wherein $R_1$ is an alkyl group or an alkenyl group having 14 to 24 carbon atoms or an alkylphenyl group having an alkyl group having 8 to 14 carbon atoms, AO is an oxyethylene group (EO) or an oxypropylene group (PO), an average number of moles of added EO is in the range from 20 to 300, a mole ratio of added EO to added PO is in the range from 1 to 7, and p is such a number that EO and PO satisfy the aforesaid relations.

(a-2): a compound represented by the following general formula

$$R_2[—COO—(AO)_m—R_3]_n \qquad (a\text{-}2)$$

wherein n is an integer of one or more, $R_2$ is a residue of carboxylic acid having n's —COOH groups and 14 to 24 carbon atoms in total, from which all the —COOH groups are removed, $R_3$ is hydrogen atom or an alkyl or an alkenyl group of 1–20 carbon atoms, AO is an oxyethylene group (EO) or an oxypropylene group (PO), an average number of moles of added EO is in the range from 20 to 300, a mole ratio of added EO to added PO is in the range from 1 to 7, and m is such a number that EO and PO satisfy the aforesaid relations.

The deinking agents (a-1)~(a-2) used in this invention, in which the alkyl chain length, the number of moles of added alkylene oxide, etc. fall in the range defined in this invention may be preferably used since they are excellent in deinking performance.

It is preferable in AO of formula (a-1) or (a-2) that the average number of moles of added EO is in the range from 50 to 90 and the mole ratio of added EO to added PO is in the range from 1.7 to 3.

The method for deinking of this invention comprises a dissociation step of waste papers, a high concentration bleaching step, a pre-flotation step, a flotation step, and a washing step, and in which the deinking agent (a) may be preferably added before the flotation step and the washing step may be preferably carried out at temperatures in the range from 50 to 60° C.

DETAILED DESCRIPTION OF THE INVENTION

In the case where $R_1$ of the general formula (a-1) is an alkyl group or an alkenyl group, when the number of carbon atoms contained therein is not more than 14, since ink flocculating power is weak due to too poor hydrophobic nature, and efficiency of removing ink at the flotation step lowers, and, particularly efficiency of washing at high temperature lowers because of low dispersion force, deinked pulp of high brightness can not be obtained, on the contrary, when the number of R1 exceeds 24, since the property for removing ink from cellulose is low due to too strong hydrophobic nature and residues of unremoved ink increase and the load applied at the washing step is increased, and, particularly the efficiency of washing at high temperature lowers, only deinked pulp of poor quality can be obtained. In the case where R1 of the general formula (a-1) is an alkylphenyl group, when the number of carbon atoms contained in the substituted alkyl group is not more than 8, since particularly the efficiency of washing decreases, deinked pulp of high brightness can not be obtained, and when the number of carbon atoms of the substituted alkyl group exceeds 14, since particularly the efficiency of washing lowers likewise, nothing but deinked pulp of poor quality can be obtained.

The compound represented by the general formula (a-1) may be produced by adding EO and PO to alcohol according to the methods conventionally publicly known. Alcohol used for preparing the compounds represented by the general formula (a-1) may be one having an alkyl group or an alkenyl group of 14~24 carbon atoms, or an alkylphenyl group having an alkyl group of 8~14 carbon atoms, and may be illustrated by 1-tetradecanol, 1-pentadecanol, 1-hexadecanol, 1-heptadecanol, 1-octadecanol (stearyl alcohol), 1-nonadecanol, 1-eicosanol, 1-heneicosanol, 1-docosanol, 1-tricosanol, 1-tetracosanol, 2-tetradecanol, 2-pentadecanol, 2-hexadecanol, 2-heptadecanol, 2-octadecanol, 2-nonadecanol, 2-eicosanol, 2-tetradecene-1-ol, 2-pentadecene-1-ol, 2-hexadecene-1-ol, 2-octadecene-1-ol, 13-tetradecene-1-ol, 15-hexadecene-1-ol, oleic alcohol, elaidyl alcohol, linoleyl alcohol, linolenyl alcohol, eleostearil alcohol, ricinoyl alcohol, cyclotetradecanol, cyclopentadecanol, cyclohexadecanol, cycloheptadecanol, cyclooctadecanol, cyclononadecanol, cyclocosanol, octylphenol, nonylphenol, etc. These alcohols may be, of course, used in combination with two or more.

Of these alcohols, alcohol having an alkyl group or an alkenyl group of 14~24 carbon atoms may be preferable, and alcohol having an alkyl group or an alkenyl group of 16~18 carbon atoms may be more preferable, and alcohol having an alkyl group of 16~18 carbon atoms may be particularly preferable.

In the general formula (a-1), AO is a mixture of an oxyethylene group (EO) with an oxypropylene group (PO), and the average number of moles of added EO may be in the range from 20 to 300, preferably in the range from 30 to 160, particularly preferably in the range from 50 to 90. The mole ratio of added EO to added PO may be in the range from 1 to 7, preferably in the range from 1.5 to 4.5, particularly preferably in the range from 1.7 to 3. If the average number of moles of added EO and the mole ratio of added EO to added PO do not fall in these ranges, regenerated pulp with excellent brightness can not be obtained. In the general formula (a-1), an addition of EO and PO may be random addition or blocked addition. Random adducts and blocked adducts in which EO is added to alcohol and then PO is added thereto may be preferable, and random addition may be further preferable.

Next, an explanation on the deinking agent of the general formula (a-2) is given below. The compound represented by the general formula (a-2) may be produced according to the method conventionally publicly known by adding EO and PO to n's-hydric carboxylic acid having 14 to 24 carbon atoms in total or esters thereof (complete esters are not required in the case of esters of polyhydric carboxylic acid). Similarly to the compound represented by the general formula (a-1), it is necessary that the average number of moles of added EO and the mole ratio of added EO to added PO fall in the specific range defined by this invention. That is to say, in the general formula (a-2), AO is a mixture of an oxyethylene group (EO) with an oxypropylene group (PO), and the average number of moles of added EO may be in the range from 20 to 300, preferably in the range from 30 to 160, particularly preferably in the range from 50 to 90. The mole ratio of added EO to added PO may be in the range from 1 to 7, preferably in the range from 1.5 to 4.5, particularly preferably in the range from 1.7 to 3. If the average number of moles of added EO and the mole ratio of added EO to added PO do not fall in these ranges, regenerated pulp with excellent brightness can not be obtained. In the general formula (a-2), an addition of EO and PO may be random addition or blocked addition. Random adducts and blocked adducts in which EO is added to carboxylic acid and then PO is added thereto may be preferable, and random adducts may be more preferably.

$R_2$ in the compound represented by the general formula (a-2) is a residue of carboxylic acid having n's —COOH groups and 14 to 24 carbon atoms in total, from which all the —COOH groups are removed. In the case where the total number of carbon atoms of the carboxylic acid is less than 14, deinked pulp of high brightness can not be obtained because of low ink flocculating power, and when the total number of carbon atoms of the carboxylic acid exceeds 24, the residues of unremoved ink increase for reason that effectiveness of removing ink from cellulose is lowered. And, deinked pulp of high sticking and low quality can be obtained.

The carboxylic acid used for preparing the compound represented by the general formula (a-2) may be one having 13 to 23 carbon atoms for $R_2$, and exemplified by myristic acid, pentadecanoic acid, palmitic acid, margaric acid, stearic acid, oleic acid, elaidic acid, linoleic acid, linolenic acid, stearolic acid, ricinoleic acid, ricinoelaidic acid, nonadecanoic acid, arachidinic acid, heneicosanoic acid, behenic acid, brassidic acid, erucic acid, tricosanoic acid, tetracosanoic acid, beef tallow fatty acid, rape oil fatty acid, fish oil fatty acid, tall oil fatty acid and the like.

In the compound represented by the general formula (a-2), $R_2$ may be a residue of alkyl polyhydric carboxylic acid. In this case, $R_2$ derives from the corresponding alkyl polyhydric carboxylic acid, and includes dimer acid and/or polymer acid of higher fatty acid having 14 to 20 carbon atoms. The dimer acid and/or polymer acid as used herein may be synthesized by a method in which a monomer of monoeneacid or dimer acid illustratively stated by unsaturated fatty acid such as oleic acid, linoleic acid, linolenic acid and the like is reacted by thermal polymerization, for example, Diels-Alder reaction or by other reaction methods. As used herein the term "polymer acid" is intended refer to polycarboxylic acid having not less than three carboxylic groups in a molecule and does not include dimer acid. It may be not objectionable that an unreacted monomer acid remains in dimer acid and/or polymer acid produced to such an extent that the effects of this invention is not damaged. And, it is not objectionable that the compounds represented by the general formula (a-2) is those prepared by mixing two kinds of fatty acids or polyhydric alkyl carboxylic acids.

$R_2$ in the general formula (a-2) may be preferably a residue of monocarboxylic acid having 14 to 24 carbon atoms in total, more preferably a residue of monocarboxylic acid having 18 to 24 carbon atoms.

In the compound represented by the general formula (a-2), $R_3$ may be hydrogen atom or an alkyl group or an akenyl group having 1 to 20 carbon atoms. These may be straight chain or branched chain. The alkyl group or alkenyl group having 1 to 20 carbon atoms may be exemplified by methyl group, ethyl group, propyl group, butyl group, t-butyl group, pentyl group, hexyl group, 2-etylhexyl group, isopentyl group, octyl group, nonyl group, decyl group, isopropyl group, propenyl group, butenyl group, hexenyl group, octenyl group, lauryl group, myristyl group, cetyl group, stearyl group and the like.

In the case where $R_2$ of the compound represented by the general formula (a-2) is an alkyl group or an alkenyl group having 1 to 20 carbon atoms, when the total number of the carbon atoms exceeds 20, the residue of unreacted ink increases, since the power for removing ink from cellulose is lowered.

$R_3$ of the compound represented by the general formula (a-2) may be preferably a hydrogen atom or an alkyl group or an alkenyl group having 6 to 18 carbon atoms, and more preferably a hydrogen atom or an alkyl group having 12 to 18 carbon atoms.

In the deinking method of this invention, the component (a) may be added in any of the steps of this invention insofar as the objective removal of ink can be achieved, and, specifically, may be added in at least one of steps in the deinking method, that is, a step for dissociating waste papers, a high concentration bleaching step, a pre-flotation step, etc. and more preferably may be added in the step for dissociating waste papers. The amount of the component (a) added may be preferably in the range from 0.03 to 1.0 weight percent to waste papers as raw materials. In the case where the component (a) is added at the pre-flotation step, an addition thereof is carried out by putting it in a tank before entering the flotation step.

In this invention, washing of pulp after completion of deinking is carried out at temperatures ranging from 40 to 80° C., preferably from 50 to 70° C., and more preferably from 50 to 60° C. When the treating temperature at the washing step is less than 40° C., the efficiency of washing ink is poor, since the hydrophilic nature of deinking agent is too strong. On the contrary, when the treating temperature at the washing step exceeds 80° C., an affinity of deinking agent for ink is too strong, and as a result, the efficiency of washing decreases and regenerated pulp of good appearance can not be obtained.

In this invention, the washing step of pulp after deinking is a step of removing minute ink after removal of ink from waste papers as raw materials, followed by removal of ink by means of flotation etc. The main deinking methods may be a flotation method and a washing method, and such a washing step may be carried out in each of methods. Although, in the flotation method, the washing step is carried out usually after the flotation step, it is not objectionable that when the general deinking step includes a washing step or concentration step of pulp slurry, the washing step may be carried out in the washing step or concentration step included in the deinking step. For example, this invention is effective in the concentration step after pulping or before kneading or bleaching. In the case where there are plural washing steps or plural concentration steps in the general deinking step, this invention is also effective in either of these plural steps or all the washing steps or concentration steps. This invention may be, of course, applied to the conventional washing method or washing or concentration step. Specifically, in this invention, the washing step may be carried out by concentrating pulp by removing some of the water by making use of a screen having a proper screen mesh after the pulping or the flotation, or preferably by adding an additional washing water to wash the pulp slurry, by dispersing remaining removed ink in the water and then by removing the washing water in the same manner as mentioned above to concentrate the pulp slurry.

In this invention, although a deinking effect can be obtained by using a deinking agent containing a component (a) independently, it can be used in combination with conventional deinking agents. The conventional deinking agents may be exemplified by higher alcohol sulfates, polyoxyalkylene higher alcohol sulfates, alkylbenzenesulfonates, fatty acids or salts thereof, adducts of alkylene oxide with higher alcohol or alkylphenol, adducts of alkylene oxide with fatty acid, adducts of alkylene oxide with mono-, di-, or tri-glyceride, adducts of alkylene oxide with partial or complete ester of polyhydric alcohol (except ones corresponding to component (a) of this invention) and the like. More excellent deinking effect can be obtained by using the fatty acids or salts thereof in combination with the other deinking agents. The fatty acids or salts thereof may be fatty acids having 8 to 24 carbon atoms or salts thereof and exemplified by caprylic acid, capric acid, lauric acid, palmitic acid, stearic acid, oleic acid, behenic acid and the like, coconut oil fatty acid, soybean oil fatty acid, rape oil fatty acid, tall oil fatty acid, castor oil fatty acid, tallow oil fatty acid, palm oil fatty acid, fish oil fatty acid and the like containing the above mentioned fatty acids, and fatty acids obtained from natural products of hydrogenated products of the above mentioned fatty acids and synthetic fatty acids. The salts of the fatty acids may be preferably sodium salt or potassium salt. The weight ratio of component (a) to fatty acid or salt thereof (component (a)/fatty acid or salt thereof (weight ratio)) may be preferably in the range from 30/70 to 70/30.

The deinking method of this invention is described by taking a flotation method as an example. The waste papers as raw materials are cut, and then put in a dissociating apparatus into which alkaline component bleaching component such as sodium hydroxide, sodium silicate, hydrogen peroxide and the like and water are added to dissociate (dissociation step). If necessary, dehydration (a dehydration step) or chemical mixing is carried out, and aging is carried out. Thereafter, water is added to dilute the concentration of pulp and a flotation treatment is carried out (a flotation step). It is not objectionable to set a kneading step (dispersing) or a refining step between the aging step and the flotation step. Washing of pulp after the deinking is carried out by concentrating pulp slurry after the flotation by means of a screen having proper screen size (washing step). In this invention, the temperature of the pulp slurry at this step is maintained in the range from 40 to 80° C. And, the washing step may be carried out twice or more. The subsequent steps are carried out according to conventional deinking methods.

EXAMPLES

While this invention is described in more detail with reference to examples, it should be understood that this invention is not limited thereto. In the following examples, "%" is on the basis of weight, unless otherwise noted.

Deinking agents used in Examples 1 and 2 are indicated in Table 1. $R_1$ and $R_2$ in Table 1 are alcohol or carboxylic acid as raw materials. The forms of addition are explained in block. P is a propylene oxide block. E is an ethylene oxide block. R is $R_1O-$ of alcohol or $R_2COO-$ of carboxylic acid.

TABLE 1

| Deinking agent No. | General formula | (a) Component R1 | R2 | R3 | Alkylene Oxide EO | EO/PO | The forms of addition |
|---|---|---|---|---|---|---|---|
| product of the present invention | | | | | | | |
| 1 | a-1 | stearyl alcohol | — | — | 63 | 2.3 | random |
| 2 | a-2 | — | palmitic acid | hydrogen | 34 | 2 | random |
| 3 | a-2 | — | stearic acid | stearyl | 65 | 2.4 | random |
| 4 | a-1 | 2-pentadecanol | — | — | 20 | 2 | R-P-E block |
| 5 | a-2 | — | linoleic acid | hydrogen | 81 | 1.8 | R-E-P block |
| 6 | a-2 | — | trimer acid | lauryl | 24 | 1 | R-P-E block |
| 7 | a-1 | oleic alcohol | — | — | 40 | 2.3 | R-E-P block |
| 8 | a-2 | — | fish oil fatty acid | 2-ethylhexyl | 34 | 4 | random |
| 9 | a-2 | — | myristic acid | lauryl | 26 | 5 | random |
| 10 | a-1 | nonylphenol | — | — | 23 | 3.5 | random |
| 11 | a-2 | — | dimer acid | hydrogen | 43 | 4.5 | R-E-P block |
| 12 | a-2 | — | tall oil fatty acid | lauryl | 150 | 3 | random |
| 13 | a-1 | 2-hexadecene-1-ol | — | — | 220 | 4 | R-P-E block |
| Comparative product | | | | | | | |
| 14 | a-1 | stearyl alcohol | — | — | 63 | 0.8 | random |
| 15 | a-2 | — | palmitic acid | hydrogen | 10 | 2 | random |
| 16 | a-2 | — | rape oil fatty acid | methyl | 17 | 6 | random |
| 17 | a-1 | 2-hexadecanol | — | — | 12 | 7 | R-E-P block |
| 18 | a-2 | — | stearic acid | myristyl | 148 | 0.8 | R-E-P block |
| 19 | a-2 | — | dimer acid | octyl | 43 | 0.5 | R-P-E block |
| 20 | a-1 | lauric alcohol | — | — | 360 | 4 | R-P-E block |
| 21 | a-2 | — | lauric acid | glycerine residue | 80 | 2 | random |

Example 1

Deinking treatment was carried out in a manner described below by the use of waste papers as raw materials comprising magazines and newspapers in weight ratio of the former to the latter of 20:80 (magazines/newspapers=20/80 (weight ratio)). The waste papers as raw materials contain 8% of mixed office waste papers.

Waste papers as raw materials were cut to an enormous of pieces of paper in size of 2×5 cm and put in a desk-top dissociating machine, then into which 1% sodium hydroxide (to the waste papers as raw materials), 3% sodium silicate (to the waste papers as raw materials), 3% hydrogen peroxide of 30% in concentration (to the waste papers as raw materials), 0.4% deinking agent indicated in Table 1 (to the waste papers as raw materials), and water were added, and dissociation was carried out in concentration of pulp of 5% at a temperature of 50 for ten minutes. After aging at a temperature of 50° C. for 60 minutes, water was added to lower the concentration of pulp to 1%, and a flotation treatment was carried out at a temperature of 50° C. for ten minutes (flotation step). The pulp slurry after flotation was concentrated to 10% by means of a screen of 80 screen mesh (washing step at a temperature of 50° C.), and thereafter water of 50° C. was added to return the concentration to 1%, and a pulp sheet was prepared by means of a tapping sheeting machine while the washing step was carrying out. In this Example, the washing step according to this invention was carried out twice in this sample.

The brightness of the pulp sheet after the flotation and that after the washing were measured respectively. The difference in brightness of the pulp between after the flotation and after the washing was evaluated for washing efficiency (%). Results obtained were shown in Table 2.

TABLE 2

| Deinking agent No. | Brightness (%) after the flotation | Brightness (%) after the washing | Washing efficiency (%) |
|---|---|---|---|
| Product of the present invention | | | |
| 1 | 48.3 | 55.5 | 7.2 |
| 2 | 48.9 | 55.7 | 6.8 |
| 3 | 48.5 | 56.2 | 7.7 |
| 4 | 48.6 | 54.3 | 5.7 |
| 5 | 48.3 | 55.6 | 7.3 |
| 6 | 48.5 | 53.7 | 5.2 |
| 7 | 48.1 | 54.8 | 6.7 |
| 8 | 48.2 | 54.3 | 6.1 |
| 9 | 47.9 | 53.6 | 5.7 |
| 10 | 47.6 | 53.4 | 5.8 |
| 11 | 48.5 | 54.5 | 6.0 |
| 12 | 48.6 | 55.1 | 6.5 |
| 13 | 49.0 | 54.1 | 5.1 |
| Comparative product | | | |
| 14 | 47.8 | 50.3 | 2.5 |
| 15 | 47.9 | 48.9 | 1.0 |
| 16 | 47.5 | 49.0 | 1.5 |
| 17 | 47.8 | 49.0 | 1.2 |
| 18 | 46.5 | 48.1 | 1.6 |
| 19 | 45.9 | 47.4 | 1.5 |
| 20 | 46.0 | 47.0 | 1.0 |
| 21 | 47.4 | 48.7 | 1.3 |

As can be seen from Table 2, the brightness of pulp after the washing is improved and washing efficiency is increased in the product of this invention compared with comparative product.

Example 2

Waste papers as raw materials ((magazines/papers 30/70 (weight ratio)) were cut to an enormous of pieces of paper in size 2×5 cm and put in a desk-top dissociating machine, then into which 1% sodium hydroxide (to the waste papers as raw materials), 3% sodium silicate (to the waste papers as raw materials), 3% hydrogen peroxide of 30% in concentration (to the waste papers as raw materials), 0.35% several kinds of deinking agents used in Example 1 (to the waste papers as raw materials), and water were added, and dissociation was carried out in the concentration of pulp of 5% at a temperature of 50° C. for ten minutes. After aging at a temperature of 60° C. for 60 minutes, water was added to lower the concentration of pulp to 1%, and a flotation treatment was carried out at a temperature of 45° C. for ten minutes (flotation step). The pulp slurries after the flotation were concentrated to 10% with changing the temperature of the slurries at 30° C., 40° C., 50° C., 60° C. and 80° C. (concentration step), and thereafter water of 20° C. was added to return the concentration to 1%, and a pulp sheet was prepared by means of a tapping sheeting machine. In this Example, the washing step of this invention was carried out once. Evaluations similar to that of Example 1 were carried out for this Example. Results obtained were shown in Table 3.

TABLE 3

| Washing temperature | Deinking agent No. | Brightness (%) after the flotation | Brightness (%) after the washing | Washing efficiency (%) |
|---|---|---|---|---|
| Example of the present invention |  |  |  |  |
| Product of the present invention |  |  |  |  |
| 40° C. | 1 | 47.8 | 52.7 | 4.9 |
| 50° C. | 1 | 47.5 | 53.8 | 6.3 |
| 60° C. | 1 | 47.8 | 54.4 | 6.6 |
| 60° C. | 3 | 48.1 | 55.0 | 6.9 |
| 60° C. | 5 | 48.0 | 54.5 | 6.5 |
| Comparative example |  |  |  |  |
| Comparative product |  |  |  |  |
| 60° C. | 14 | 47.5 | 48.4 | 0.9 |
|  | 16 | 47.2 | 48.2 | 1.0 |
| Product of the present invention |  |  |  |  |
| 30° C. | 1 | 48.0 | 49.6 | 1.6 |
|  | 3 | 48.2 | 49.6 | 1.4 |
|  | 5 | 48.1 | 49.7 | 1.6 |
| Comparative product |  |  |  |  |
|  | 14 | 47.7 | 48.7 | 1.0 |
|  | 16 | 47.5 | 47.8 | 1.2 |
| Product of the present invention |  |  |  |  |
| 85° C. | 1 | 47.4 | 48.7 | 1.3 |
|  | 3 | 47.6 | 48.9 | 1.3 |
|  | 5 | 47.6 | 49.0 | 1.4 |

TABLE 3-continued

| Washing temperature | Deinking agent No. | Brightness (%) after the flotation | Brightness (%) after the washing | Washing efficiency (%) |
|---|---|---|---|---|
| Comparative product |  |  |  |  |
|  | 14 | 47.1 | 48.1 | 1.0 |
|  | 16 | 47.3 | 48.2 | 0.9 |

As can be seen from Table 3, the brightness of pulp after the washing is improved and washing efficiency is increased in this Example of this invention compared with comparative Example. On the other hand, improvement in washing efficiency can be hardly observed when using comparative deinking agents, even if the washing step is carried out at a temperature of 60° C.

What is claimed is:

1. A method for deinking paper waste, which comprises the steps of deinking the paper waste with at least one deinking agent(a) selected from the group consisting of nonionic surfactants having the formula (a-1) or (a-2) and then washing the deinked pulp at a temperature ranging from 40 to 80° C.

$$R^1-O-(AO)^p-H \qquad (a\text{-}1)$$

in which R1 is a C14–24 alkyl or alkenyl or an alkylphenyl having a C8–14 alkyl, AO is an oxyethylene group (EO) or an oxypropylene group (PO), the mole number of added EO ranges from 20 to 300 on the average, a mole ratio of added EO to added PO ranges from 1 to 7 and p is a number to meet the foregoing definitions of EO and PO;

$$R^2[-COO-(AO)^m-R^3]n \qquad (a\text{-}2)$$

in which n is an integer of one or more, R2 is a residue of a carboxylic acid having n's —COOH groups and having 14 to 24 carbon atoms in total, from which all the —COOH groups have been removed, R3 is hydrogen atom or a C1–20 alkyl or alkenyl, AO is an oxyethylene group (EO) or an oxypropylene group (PO), the mole number of added EO ranges from 20 to 300 on the average, a mole ratio of added EO to added PO ranges from 1 to 7 and m is a number to meet the foregoing definitions of EO and PO.

2. A method for deinking of claim 1, wherein in AO of the formula (a-1) or (a-2), the average number of moles of added EO is in the range from 30 to 160, and the mole ratio of added EO to added PO is in the range from 1.5 to 4.5.

3. A method for deinking of claim 1, wherein $R_1$ in the formula (a-1) is an alkyl group or an alkenyl group having 14 to 24 carbon atoms.

4. A method for deinking of claim 1, wherein R2 in the formula (a-2) is a residue of monocarboxylic acid having 14 to 24 carbon atoms in total, and $R_3$ is a hydrogen or an alkyl group or an alkenyl group having 6 to 18 carbon atoms.

5. A method for deinking of claim 1, wherein washing of pulp after deinking is carried out at temperatures from 50 to 70° C.

6. A method for deinking of claim 1, wherein at least one kind of deinking agent selected from the group consisting of (a-1) and (a-2) set forth is added to a step for pulping the waste papers as raw materials.

7. A method for deinking of claim 1, wherein at least one kind of deinking agent selected from the group consisting of (a -1) and (a-2) set forth is used in the range from 0.03 to 1.0 weight % to the waste papers as raw materials.

8. A method for deinking of claim 1, wherein in AO of the formula (a-1) or (a-2), the average number of moles of added EO is in the range from 50 to 90, and the mole ratio of added EO to added PO is in the range from 1.7 to 3.

9. A method for deinking of claim 1, wherein the method comprises a pulping step of the waste papers, a high concentration bleaching step, a pre-flotation step, a flotation step and a washing step, and the deinking agent (a) is added before the floatation step, and the washing step is carried out at a temperature from 50 to 60° C.

10. A method according to claim 1 wherein said paper waste is derived from newspapers, magazines, office paper or mixtures thereof.

\* \* \* \* \*